(12) United States Patent
Ballantyne et al.

(10) Patent No.: US 7,646,731 B2
(45) Date of Patent: Jan. 12, 2010

(54) ROUTE MONITORING IN A NETWORK MANAGEMENT SYSTEM

(75) Inventors: Andrew Ballantyne, San Francisco, CA (US); Gil Sheinfeld, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 382 days.

(21) Appl. No.: 11/642,175

(22) Filed: Dec. 19, 2006

(65) Prior Publication Data

US 2008/0144627 A1 Jun. 19, 2008

(51) Int. Cl.
*H04L 12/28* (2006.01)
*H04L 12/26* (2006.01)
*H04L 12/56* (2006.01)

(52) U.S. Cl. ............... 370/254; 370/241; 370/389; 370/395.31; 370/395.53; 370/398

(58) Field of Classification Search ............ None
See application file for complete search history.

(56) References Cited

U.S. PATENT DOCUMENTS

| 7,336,613 B2* | 2/2008 | Lloyd et al. ............ 370/237 |
| 2004/0151123 A1* | 8/2004 | Lau et al. ............... 370/252 |
| 2008/0031157 A1* | 2/2008 | Tamboise et al. ........ 370/254 |

OTHER PUBLICATIONS

Anonymous, "InCharge Network Protocol Manager for BGP User's Guide Version 1.1," pp. 1-84, System Management ARTS Incorporated, 2004.

Sharad Agarwal et al., "Impact of BGP Dynamics on Router CPU Utilization," pp. 1-11, downloaded from research.microsoft.com on Mar. 13, 2007, publication date 2003.

Elias Aravantinos et al., "An approach to a methodology and implementation of a Network Monitoring Analysis Tool," pp. 1-5, Research Academic Computer Technology Institute, Patras, Greece, 2000.

Anja Feldmann et al., "Measuring BGP Pass-Through Times," pp. 1-12, pub. by Passive & Active Measurement Workshop 2004, www.pam2004.org, Apr. 2004.

D. Farinacci et al., "Generic Routing Encapsulation (GRE)," pp. 1-9, IETF Network Working Group Request for Comments (RFC) 2784, Mar. 2000.

* cited by examiner

*Primary Examiner*—Ayaz R Sheikh
*Assistant Examiner*—Sori A Aga
(74) *Attorney, Agent, or Firm*—Hickman Palermo Truong & Becker LLP

(57) ABSTRACT

A network management system comprises generic routing encapsulation (GRE) logic configured to establish upon request one or more GRE tunnels from one or more network interfaces; routing protocol logic, coupled to a route database in the apparatus, and configured to operate a network routing protocol and to exchange network route information; network management logic configured to request the GRE logic to establish a particular GRE tunnel from the apparatus to a particular router in the network, to request the routing protocol logic to establish a synchronized route database associated with the apparatus for the particular router using the particular GRE tunnel, to determine whether the synchronized route database is missing one or more particular routes, and to generate a notification message when the synchronized route database is missing the one or more particular routes.

25 Claims, 5 Drawing Sheets

ROUTE MONITORING IN A NETWORK MANAGEMENT SYSTEM

FIELD OF THE INVENTION

The present disclosure generally relates to network management.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Certain network service providers operate large, complex networks that comprise thousands of infrastructure devices such as routers and switches. An interdomain routing protocol such as Border Gateway Protocol (BGP) is often used to manage the storage and interchange of path or route information among the infrastructure devices. BGP and other routing protocols use local route databases to manage route information. Such service providers may offer virtual private network (VPN) services to customers and may use multiprotocol label switching (MPLS) to forward data on VPNs.

Such service providers need to monitor the route databases that are stored in the infrastructure devices. For example, service providers may need to monitor Layer 3 VPN routes to determine if key routes have been removed from a customer's VPN. However, conventional approaches to monitoring such routes are CPU-intensive and are not scalable for high volumes of data. Some service providers use SNMP or Telnet to connect to each managed router individually and to collect or "poll" for data such as topology information, routing table entries, and MPLS labels. An approach that relies on individual device polling is not workable in large networks. There may be hundreds or thousands of routes to monitor on just one provider edge router of an MPLS-based network. Thus, a particular router may receive too many SNMP requests and may be unable to respond to all of the requests while still having enough processing power to perform packet routing and forwarding.

Further, a typical polling approach involves using SNMP to poll a router for an entire routing table, for example, using an SNMP GET BULK operation, and the table is then compared to a locally stored copy of the table to determine if any routing table information changed. However, if a loss of connectivity in an access circuit occurs or another connection loss occurs in the customer's own network, part of the routing table may be lost. Therefore, another SNMP poll operation must be performed and the entire routing table must be transmitted again. This burdens the target router with too much management traffic. Moreover, the routing tables are encoded using SNMP object identifiers, and SNMP data transfers involve transferring extensive encoding or formatting information in addition to actual route data. Thus, SNMP poll approaches are inefficient.

When BGP is the routing protocol, a BGP route reflector node could be monitored, but this approach places an undesirable traffic load on the node, which is a key device in the service provider's network. Further, the network management station is typically several physical "hops" away from a particular router or switch of interest, and therefore the network management station cannot use routing protocol adjacencies to obtain information from the router or switch.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
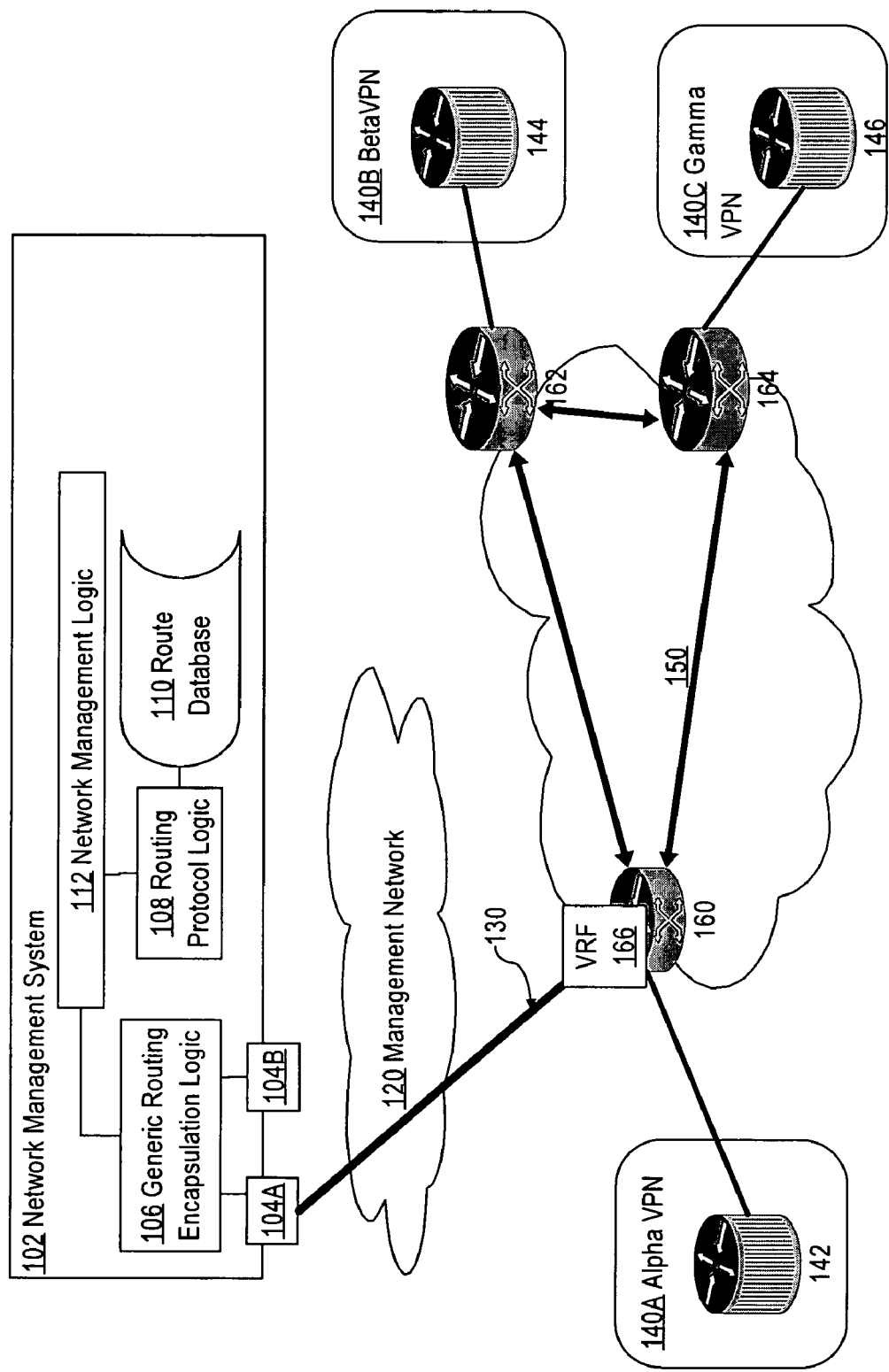
FIG. 1 illustrates an example network management system that can perform route monitoring and an example network arrangement.

Route monitoring in a network management system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| 3.0 | Route Monitoring in a Network Management system |
| 4.0 | Implementation Mechanisms-Hardware Overview |
| 5.0 | Extensions and Alternatives |

1.0 General Overview

In one embodiment, a data processing apparatus, comprises one or more processors; one or more network interfaces that couple the one or more processors to a network; generic routing encapsulation (GRE) logic configured to establish upon request one or more GRE tunnels from one or more network interfaces; routing protocol logic, coupled to a route database in the apparatus, and configured to operate a network routing protocol and to exchange network route information; network management logic configured to request the GRE logic to establish a particular GRE tunnel from the apparatus to a particular router in the network, to request the routing protocol logic to establish a synchronized route database associated with the apparatus for the particular router using the particular GRE tunnel, to determine whether the synchronized route database is missing one or more particular routes, and to generate a notification message when the synchronized route database is missing the one or more particular routes.

In one embodiment, the routing protocol logic implements Border Gateway Protocol version 4 (BGPv4). In one embodiment, the routing protocol logic implements any of Open Shortest Path First (OSPF) protocol, Intermediate System-Intermediate System (IS-IS) protocol, RIP, and RIPv2.

In one embodiment, the network management logic is configured to request the GRE logic to establish the particular GRE tunnel to a provider edge router of an MPLS network of a network service provider. In one embodiment, the network management logic is configured to request the GRE logic to establish a plurality of GRE tunnels to a provider edge router of an MPLS network of a network service provider, wherein each tunnel in the plurality of GRE tunnels is associated with a different customer or VPN of the network service provider.

In one embodiment, the network management logic is configured to request the GRE logic to establish the particular GRE tunnel to a router that is two or more physical hops, in the network, away from the apparatus.

In one embodiment, the network management logic is further configured to request the routing protocol logic to provide one or more values from the synchronized route database, using an SNMP request. In one embodiment, the network management logic is further configured to request the routing protocol logic to provide one or more values from the synchronized route database, using a TELNET connection.

In an embodiment, a data processing apparatus comprises one or more processors; one or more network interfaces that couple the one or more processors to a network; means for establishing upon request one or more generic routing encapsulation (GRE) tunnels from the one or more network interfaces; means coupled to a route database in the apparatus for operating a network routing protocol and for exchanging network route information; means for requesting the GRE logic to establish a particular GRE tunnel from the apparatus to a particular router in the network, requesting the routing protocol logic to establish a synchronized route database associated with the apparatus for the particular router using the particular GRE tunnel, determining whether the synchronized route database is missing one or more particular routes, and generating a notification message when the synchronized route database is missing the one or more particular routes. In an embodiment, the apparatus comprises a network management system.

In an embodiment, a machine-implemented method comprises establishing one or more generic routing encapsulation (GRE) tunnels through a network from a network management system to a router in the network; operating a routing protocol on the network management system; exchanging network route update information through the one or more GRE tunnels with the router in the network, using the routing protocol; creating and storing a first route database in the network management system, wherein the first route database is synchronized to second route database of the router, based on the exchanging; determining whether the first route database is missing one or more particular routes; generating a notification message in the network when the first route database is missing the one or more particular routes.

In an embodiment, the method comprises operating Border Gateway Protocol version 4 (BGPv4) as the routing protocol. In an embodiment, the method comprises operating any of Open Shortest Path First (OSPF) protocol, Intermediate System-Intermediate System (IS-IS) protocol, RIP, and RIPv2 as the routing protocol.

In an embodiment, the method comprises requesting the GRE logic to establish the particular GRE tunnel to a provider edge router of an MPLS network of a network service provider. In an embodiment, the method comprises requesting the GRE logic to establish a plurality of GRE tunnels to a provider edge router of an MPLS network of a network service provider, wherein each tunnel in the plurality of GRE tunnels is associated with a different customer or VPN of the network service provider.

In an embodiment, the method comprises requesting the GRE logic to establish the particular GRE tunnel to a router that is two or more physical hops, in the network, away from the method. In an embodiment, the method comprises requesting the routing protocol logic to provide one or more values from the synchronized route database, using an SNMP request.

In an embodiment, the method comprises requesting the routing protocol logic to provide one or more values from the synchronized route database, using a TELNET connection.

In an embodiment, a computer-readable tangible storage medium carrying one or more sequences of instructions, which instructions, when executed by one or more processors, cause the one or more processors to carry out the steps of: establishing one or more generic routing encapsulation (GRE) tunnels through a network from a network management system to a router in the network; operating a routing protocol on the network management system; exchanging network route update information through the one or more GRE tunnels with the router in the network, using the routing protocol; creating and storing a first route database in the network management system, wherein the first route database is synchronized to second route database of the router, based on the exchanging; determining whether the first route database is missing one or more particular routes; generating a notification message in the network when the first route database is missing the one or more particular routes.

Other aspects, features and embodiments are described in the following sections.

2.0 Structural and Functional Overview

In an embodiment, a network management system comprises a virtual router having tunnel encapsulation logic and routing protocol logic. The network management system uses a GRE tunnel and the routing protocol, managed using the virtual router, to form a one-hop adjacency to a real router in a service provider network. The virtual router collects routing tables from the real router. The virtual router repeats such a process for all real routers of interest in the service provider network. Network management logic then can poll the routing tables of the virtual router in the network management system, rather than the real routers of the service provider network.

The virtual router can collect routing tables, MPLS labels, and other information in the real routers. The virtual router uses normal routing protocol update mechanisms under RIP, OSPF, IS-IS, or BGP to obtain route information of interest, and can use label distribution protocol (LDP) to collect label information. The network management logic can poll the virtual router to detect changes to the local route database including changes in routes or labels.

FIG. 1 illustrates an example network management system that can perform route monitoring and an example network arrangement. A network management system 102 comprises one or more network interfaces 104A, 104B, generic routing encapsulation (GRE) logic 106, routing protocol logic 108, a route database 110, and network management logic 112. The network management system 102 may comprise a general purpose personal computer, workstation, or server that hosts network management software, such as Cisco IP Solution Center from Cisco Systems, Inc., San Jose, Calif., and the other logical and functional elements described herein. Network management system 102 may comprise one or more processors of any suitable processing speed or capability.

The interfaces 104A, 104B are coupled directly or indirectly through a management network 120 to a service provider network 150. For purposes of illustrating a clear example, FIG. 1 shows two interfaces 104A, 104B. However, in a practical embodiment, network management system 102 may comprise any number of interfaces. Network management system 102 is not involved in routing or forwarding packets originating in or destined for network 150 or elements in the network 150. Network management system 102 does not advertise reachability from itself to other routers, switches or endpoints.

In an embodiment, service provider network 150 comprises a plurality of routers and switches that implement MPLS and carry Layer 3 VPN traffic. Alternatively, network 150 is an IP network that does not use MPLS and that does not support VPNs. The use of MPLS or VPN traffic is not critical. In this description, the term "router," used in reference to a router in network 150, means a packet data router, a switch, or any other network infrastructure device or element that may store route information.

The GRE logic 106 implements GRE on the network management system 102. Using GRE, as further described herein, the network management system 102 can establish one or more GRE tunnels to routers in the service provider network 150. GRE is identified herein merely to describe a clear example. Alternative embodiments may use any other convenient encapsulation protocol that can establish a tunnel between endpoints such that the endpoints appear to be one logical hop apart.

The routing protocol logic 108 implements a network routing protocol, which may comprise any of Border Gateway Protocol version 4 (BGPv4), Open Shortest Path First (OSPF) protocol, Intermediate System-Intermediate System (IS-IS) protocol, RIP, and RIPv2. The routing protocol logic 108 creates and manages the route database 110. The route database 110 comprises one or more routing information data structures that are synchronized to and contain equivalent route information in the routers and switches of the service provider network 150, even though the route database 110 is not contained within the service provider network 150 or any infrastructure element in the service provider network.

Figure 3:
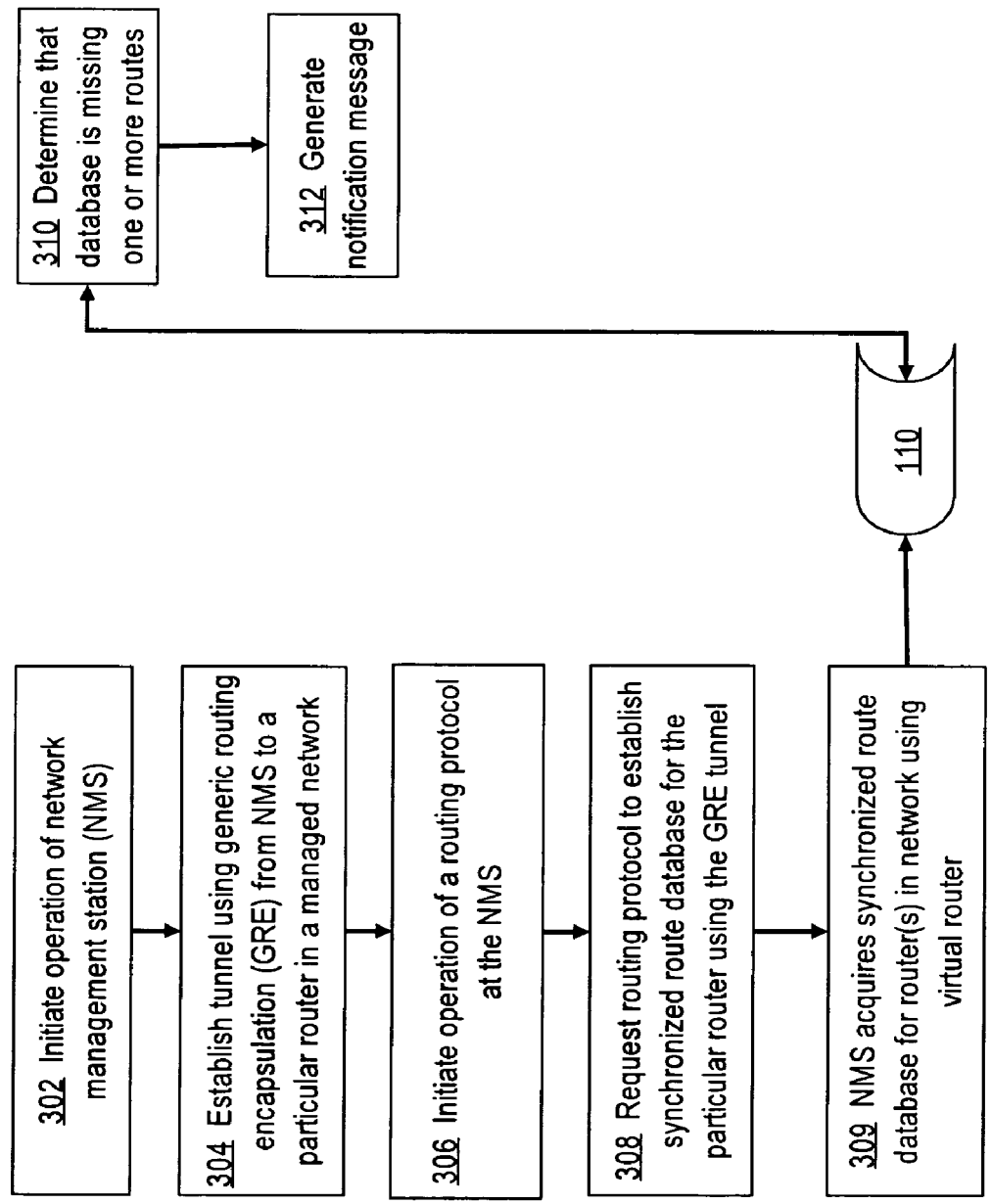
FIG. 3 illustrates an example method of route monitoring in a network management system.
Figure 4:
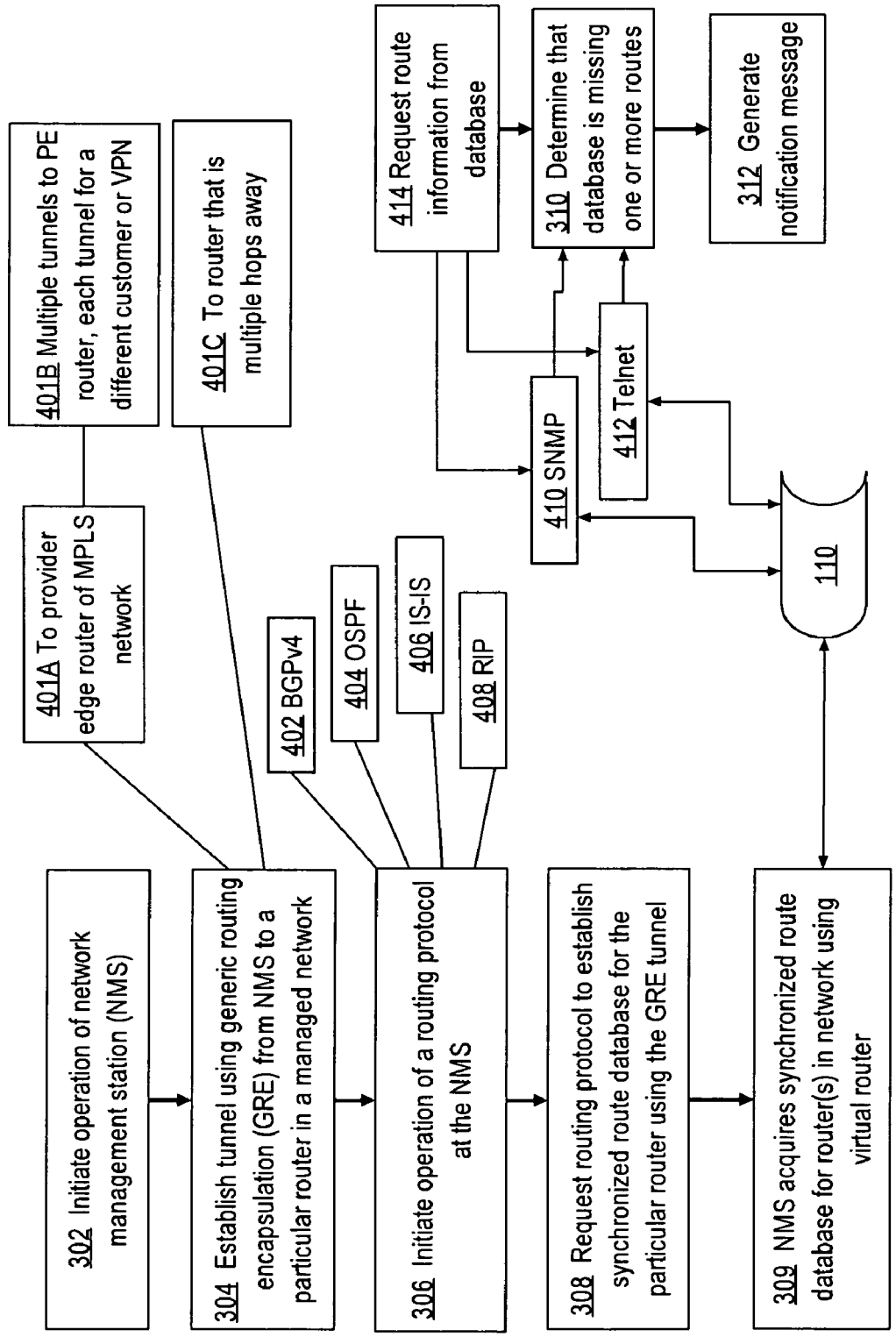
FIG. 4 illustrates an example method of route monitoring in a network management system.

Network management logic 112 implements the processes that are described further herein in connection with FIG. 3 and FIG. 4. More generally, network management logic 112 supervises use of GRE logic 106 to establish GRE tunnels, and use of routing protocol logic 108 to create and manage the route database 110 based on information from the service provider network 150. Further, network management logic 112 implements processes to poll the route database 110 to determine whether required routes are missing from the route database, and to generate notification messages in response to detecting problems in the route database. As a result, network management logic 112 can effectively monitor the service provider network 150 without having to establish individual SNMP or Telnet connections to each provider edge router.

Each of the generic routing encapsulation (GRE) logic 106, routing protocol logic 108, and network management logic 112 may comprise one or more computer programs, methods, objects or other software elements that implement the functions described herein. In certain embodiments, generic routing encapsulation (GRE) logic 106, routing protocol logic 108, and network management logic 112 may be implemented using other forms of firmware, hardware, or a combination. In an embodiment, the functional elements described herein may be packaged, offered or embodied as a virtual router that can be installed on an existing network management system.

The virtual routers can run probes, such as IP SLA probes, or ICMP probes, for direct monitoring of network conditions. Probes can be run from the individual virtual routers to diagnose faults or determine current device operating characteristics. By running probes in the virtual routers, target devices are not required to allocate excessive amounts of memory to probe processes and shadow routers are not needed to manage the probes. In an embodiment, the virtual router can distribute a route for a return path of probe packets.

In an embodiment, network management system 102 establishes a GRE tunnel 130 from an interface, such as interface 104A, to a GRE tunnel interface that is associated with a VPN route forwarding table (VRF) 166 of a provider edge router 160 in service provider network 150. Network management system 102 may implement any number of VRFs on a virtual router to serve as a local endpoint of the GRE tunnel 130. Although management network 120 and service provider network 150 may comprise multiple routers, switches or other "hops" that are physically interposed between the network management station 102 and the provider edge router 160, the GRE tunnel 130 establishes an adjacency of one logical hop between the network management station 102 and the provider edge router 160.

Service provider network 150 may comprise any number of provider edge routers such as router 160, 162, 164 of FIG. 1. Each of the provider edge routers 160, 162, 164 is coupled to a respective customer edge router, such as routers 142, 144, 146. In an embodiment, each of the customer edge routers 142, 144, 146 is associated with a different virtual private network (VPN) 140A, 140B, 140C.

In this arrangement, using the GRE tunnel 130, routing protocol logic 108 can acquire all routes from the Alpha VPN 140A that is associated with VRF 166 on provider edge router 160 using efficient routing updates that are conducted according to the routing protocol that the routing protocol logic implements. For example, when routing protocol logic 108 implements BGP, then BGP route messages are used to acquire routes. Concurrently or subsequently, network management system 102 can establish another GRE tunnel to each of the other provider edge routers 162, 164 and the routing protocol logic 108 can acquire routes of the Beta VPN 140B and Gamma VPN 140C, and update route database 110 with all such routes.

Further, the use of GRE tunnel 130 establishes a one logical hop source-route mechanism between the network management system 102 and the provider edge router 160. Provider edge router 160, and other routers in the service provider network 150 to which the network management system 102 connects, advertise routes by default over such a source-route mechanisms when the routers run a routing protocol such as BGP, OSPF, IS-IS, or RIP.

Using GRE tunnel 130 enables the approach herein to traverse network segments that do not support the routing protocol of target routers in network 150. For example, the network management system 102 can establish a GRE tunnel 130 to provider edge router 164, and run BGP between the NMS 102 and the router 164 to acquire synchronized route information, even though other routers in the core of the network 150 between NMS 102 and the router 164 do not run BGP.

Figure 2:
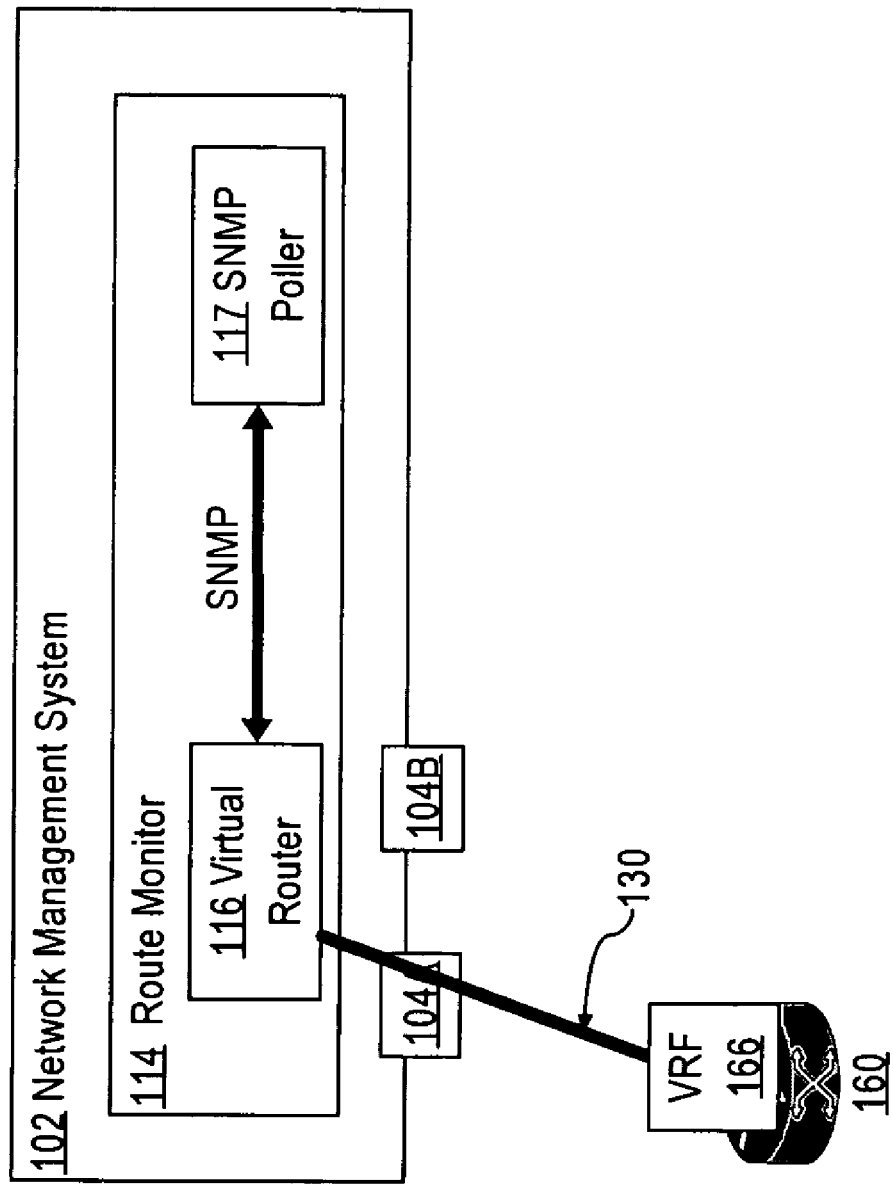
FIG. 2 illustrates an example network management system and tunnel to a managed router.

FIG. 2 illustrates an example network management system and tunnel to a managed router. In the embodiment of FIG. 2, network management system comprises a route monitor 114 that includes a virtual router 116 and an SNMP poller 117. The virtual router 116 includes GRE logic, routing protocol logic, and a route database as in FIG. 1. The virtual router 116 receives SNMP poll requests for data from SNMP poller 117 and responds with information about missing routes in the route database. Route monitor 114 instructs the SNMP poller 117 to initiate local poll requests to the virtual router. Route monitor 114 also implements a comparison tool that detects the loss of known good routes or "must have" routes. If route monitor 114 detects a missing route, then the route monitor can generate an SNMP trap, a notification, an alarm, or an alert message, or take other action.

To illustrate a simple example, FIG. 2 shows one virtual router 116 hosted in network management system 102. In other embodiments, any number of virtual routers may be supported. For example, in one specifically contemplated embodiment, a single server hosts hundreds of virtual router instances. For example, one virtual router could be established for each customer of a service provider. Alternatively, there can be one virtual router and one VRF per customer. In any such embodiment, BGP may be used as the routing protocol and over 100,000 routes can be individually monitored using the virtual router.

In an embodiment, virtual router 116 is implemented using Cisco IOU technology, comprising Cisco IOS Software® on UNIX, in which a router operating system runs on a UNIX server operating as a network management station; in this arrangement, the NMS can function as a virtual router. Alternatively, an implementation may use another operating system that natively implements a routing protocol, such as LINUX, which implements BGP, RIP, and RIPv2. In still another alternative, software implementing a routing protocol can be hosted on a general purpose processor with a general purpose operating system and modified or supplemented with logic to implement the tunneling, polling, monitoring and determining functions described herein.

3.0 Route Monitoring in a Network Management System

FIG. 3 illustrates an example method of route monitoring in a network management system. FIG. 4 illustrates an example method of route monitoring in a network management system. Referring first to FIG. 3, in step 302, operation of a network management station (NMS) is initiated. Step 302 broadly represents any of several operations that may be involved in initiating operation of an NMS, such as deployment, bootstrapping, power-up, and others. Step 302 broadly illustrates that the process of FIG. 3 occurs in the context of operating a network management system.

In step 304, a communication tunnel is established using generic routing encapsulation (GRE) or a similar encapsulation protocol. The tunnel is established between the NMS and a particular router in a managed network or monitored network. For example, in the context of FIG. 1 and FIG. 2, NMS 102 establishes tunnel 130 to VRF 166 of provider edge router 160 in network 150.

In step 306, operation of a routing protocol is initiated at the NMS. For example, the NMS starts running BGP, IS-IS, RIP, or a similar routing protocol.

In step 308, the routing protocol is requested to establish a synchronized route database for the particular router using the GRE tunnel. In response, the routing protocol initiates one or more route update message exchanges with the particular router in the managed network. Using such message exchanges, as shown in step 309, the routing protocol acquires and stores in the route database a synchronized copy of route information in the routers of the network.

The message exchanges may occur repeatedly and may run continuously as long as the routing protocol is running on the NMS. Thus, the NMS is not required to perform bulk routing table transfer operations with the target router, as in prior approaches. Instead, the routing protocol transparently and continuously updates the route database 110, which becomes continuously synchronized to the target router as long as the routing protocol is running on the NMS.

The particular form and number of the message exchanges will vary according to the routing protocol that is used. Steps 306, 308, and 309 broadly illustrate that the network management system acquires, by running a routing protocol locally and using message exchanges according to the routing protocol, a copy of routes that are stored in the managed network or monitored network. The steps do not require using SNMP or other polling to acquire copies of route tables stored in the routers; instead, efficient route update mechanisms inherent to the routing protocols are used. In combination, steps 304 to 309 essentially implement a virtual router that acts as a peer, under the particular routing protocol, to a target device in the managed network or monitored network.

In one embodiment, at step 310, a determination is made that the route database at the NMS is missing one or more routes. A route may be lost, for example, if connectivity is lost in a particular customer site or in an access circuit or if a VPN goes down. In response, a notification message is generated in step 312. The notification message may comprise an SNMP trap, alert, alarm, or any other suitable form of message. The specific type of message is not critical.

Alternatively, steps 310 and 312 are omitted, or other processing is performed on the synchronized route database after the database is initially prepared or compiled. Thus, monitoring for route discrepancies at steps 310 and 312 is optional, and the synchronized route database 110 in the NMS 102 may be used for many other functions and purposes. For example, the route database 110 may support certain accounting functions with which customers are charged for injecting large numbers of routes or too many routes into a PE router.

Referring now to FIG. 4, in step 302, as in FIG. 3, operation of a network management station (NMS) is initiated. In step 304, a communication tunnel is established using generic routing encapsulation (GRE) or a similar encapsulation protocol. In various embodiments: the tunnel is established between the NMS and a particular router in a managed network or monitored network (step 304); the tunnel is established to a provider edge router of an MPLS network (step 401A); multiple tunnels are established to a provider edge router, in which each tunnel is associated with a different customer or VPN (step 401B); and the tunnel is established to a router that is multiple physical hops away (step 401C).

In step 306, operation of a routing protocol is initiated at the NMS. For example, the NMS starts running any of: BGPv4 (step 402); OSPF (step 404); IS-IS (step 406); RIP (step 408); or a similar routing protocol.

In step 308, the routing protocol is requested to establish a synchronized route database for the particular router using the GRE tunnel. In response, the routing protocol initiates one or more route update message exchanges with the particular router in the managed network. Using such message exchanges, as shown in step 309, the routing protocol acquires and stores in the route database a synchronized copy of route information in the routers of the network.

In step 414, route information is requested from the synchronized route database. For example, network management logic or a route monitor initiates a local SNMP poll (step 410) to the route database 110 to determine if a particular route is present. Alternatively, step 414 comprises establishing a Telnet connection from the network management logic or route monitor to the route database 110 and requesting information on a particular route. In either embodiment, a response is received. The response comprises route information and need not be encoded in SNMP table format. In step 310, a determination is made that the route database at the NMS is missing one or more routes. In response, a notification message is generated in step 312.

When network management system 102 is implemented on a server-class computer, essentially any number of poll operations may be performed at step 414 because the routing information is stored in a local database 110 and because such a computer normally has far higher processing capability than a device in the network 150. The poll operations eliminate the use of SNMP table encoding because the polled data comprises routes in route database 110 rather than SNMP formatted routing tables on actual routers.

As an alternative, step 414 may comprise a network administrator issuing CLI commands to collect routing information.

Thus, embodiments provide for the use of routing protocols on an NMS to collect routing information, and to build a routing table local to a NMS. The NMS then can monitor the routing tables on the virtual routers on the NMS.

Such embodiments have numerous benefits as compared to prior approaches. For example, a network management station uses routing protocols within a GRE tunnel to communicate with network infrastructure devices. The network management station is not required to use SNMP, Telnet, CORBA, or other direct communication mechanisms on an individual basis for every router or switch in the service provider network. The network management station provides virtual routers running a routing protocol to collect routing tables. Efficient data transfer of routes, without SNMP table encoding information, is used, and the routing protocols have inherent synchronization mechanisms. GRE tunnels allow establishing one-hop adjacency to multiple real routers and multiple VRNs or VRFs.

Further, each real router in the service provider network does not incur the processing load that would be involved in responding to SNMP requests if conventional techniques are used. Routing protocols such as BGP implement various methods to synchronize routing tables and topology databases that do not cause scalability problems. The approach can be implemented using server hardware that has significant CPU capacity and the ability to accommodate many virtual routers. The virtual routers can run probes, such as IP SLA probes, or ICMP probes, for direct monitoring of network conditions. Probes can be run from the individual virtual routers to diagnose faults or determine current device operating characteristics.

Still further, the collection of data from devices is consolidated at a central point, the network management system, so that devices do not potentially receive multiple SNMP GET requests from many different departments or systems in an enterprise.

Embodiments may be used by any vendor of network management technology and any other person or business entity that implements a network management station.

4.0 Implementation Mechanisms—Hardware Overview

Figure 5:
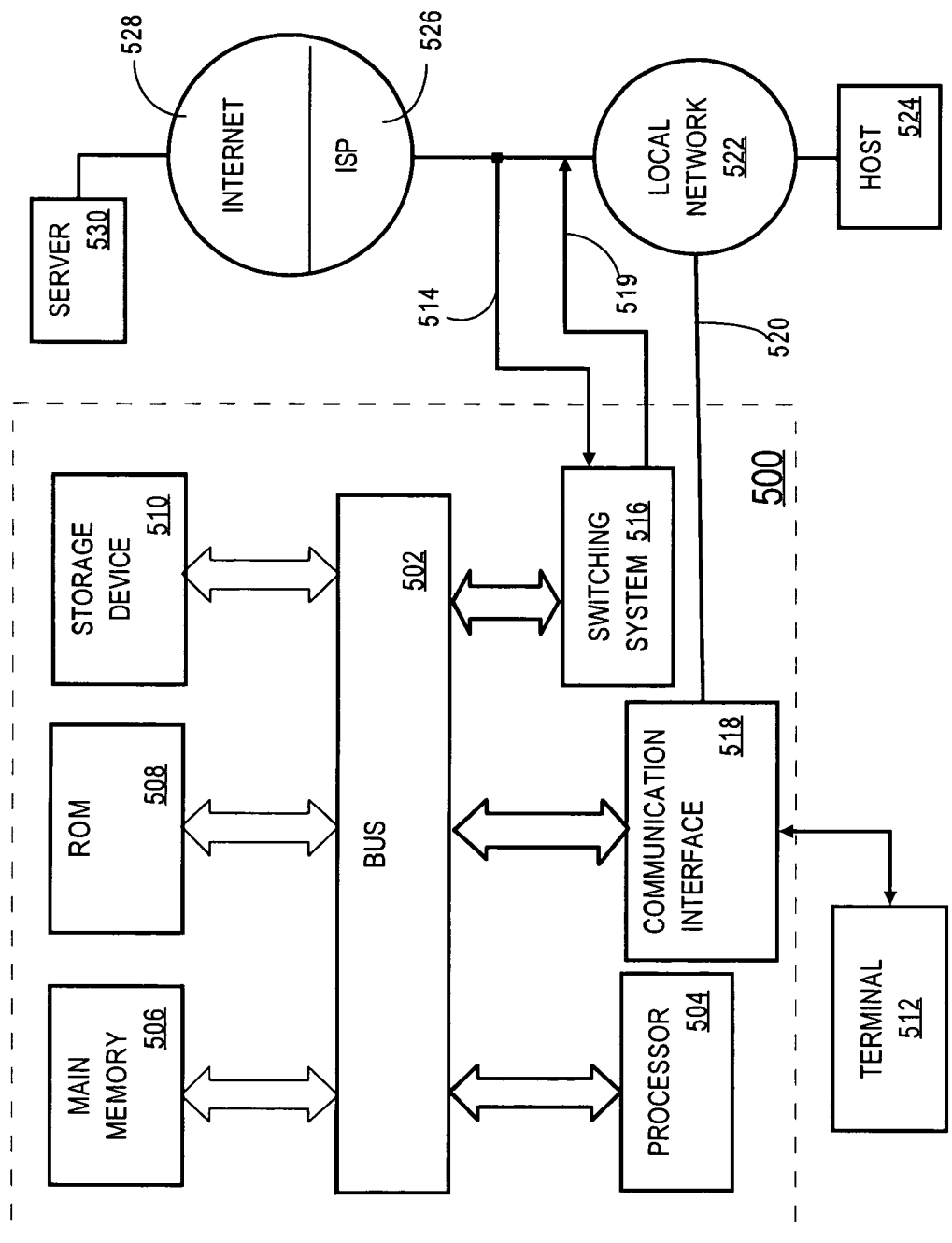
FIG. 5 illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for route monitoring in a network management system. According to one embodiment of the invention, route monitoring in a network management system is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for route monitoring in a network management system as described herein.

The received code may be executed by processor 504 as it is received, and/or stored in storage device 510, or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A data processing apparatus, comprising:
   one or more processors;
   one or more network interfaces that couple the one or more processors to a network;
   generic routing encapsulation (GRE) logic configured to establish upon request one or more GRE tunnels from the one or more network interfaces;
   routing protocol logic, coupled to a route database in the apparatus, and configured to operate a network routing protocol and to exchange network route information,
   wherein the route database comprises routing information specifying where to route received packets;
   network management logic configured to request the GRE logic to establish a particular GRE tunnel from the apparatus to a particular router in the network, to request the routing protocol logic to synchronize the route database associated with the apparatus for the particular router using the particular GRE tunnel, to determine whether the synchronized route database is missing one or more particular routes, and to generate a notification message when the synchronized route database is missing the one or more particular routes;
   wherein the apparatus comprises a network management system.

2. The apparatus of claim 1, wherein the routing protocol logic implements Border Gateway Protocol version 4 (BGPv4).

3. The apparatus of claim 1, wherein the routing protocol logic implements any of Open Shortest Path First (OSPF) protocol, Intermediate System-Intermediate System (IS-IS) protocol, RIP, and RIPv2.

4. The apparatus of claim 1, wherein the network management logic is configured to request the GRE logic to establish the particular GRE tunnel to a provider edge router of a multiprotocol label switching (MPLS) network of a network service provider.

5. The apparatus of claim 1, wherein the network management logic is configured to request the GRE logic to establish a plurality of GRE tunnels to a provider edge router of an MPLS network of a network service provider, wherein each tunnel in the plurality of GRE tunnels is associated with a different customer or virtual private network (VPN) of the network service provider.

6. The apparatus of claim 1, wherein the network management logic is configured to request the GRE logic to establish the particular GRE tunnel to a router that is two or more physical hops, in the network, away from the apparatus.

7. The apparatus of claim 1, wherein the network management logic is further configured to request the routing protocol logic to provide one or more values from the synchronized route database, using a simple network management protocol (SNMP) request.

8. The apparatus of claim 1, wherein the network management logic is further configured to request the routing protocol logic to provide one or more values from the synchronized route database, using a TELNET connection.

9. A data processing apparatus, comprising:
   one or more processors;
   one or more network interfaces that couple the one or more processors to a network;
   means for establishing upon request one or more generic routing encapsulation (GRE) tunnels from the one or more network interfaces;
   means coupled to a route database in the apparatus for operating a network routing protocol and for exchanging network route information;
   wherein the route database comprises routing information specifying where to route received packets;
   means for requesting a GRE logic to establish a particular GRE tunnel from the apparatus to a particular router in the network, requesting the routing protocol logic to synchronize the route database associated with the apparatus for the particular router using the particular GRE tunnel, determining whether the synchronized route database is missing one or more particular routes, and generating a notification message when the synchronized route database is missing the one or more particular routes
   wherein the apparatus comprises a network management system.

10. The apparatus of claim 9, wherein the routing protocol operating means comprises means for operating Border Gateway Protocol version 4 (BGPv4).

11. The apparatus of claim 9, wherein the routing protocol operating means comprises means for operating any of Open Shortest Path First (OSPF) protocol, Intermediate System-Intermediate System (IS-IS) protocol, RIP, and RIPv2.

12. The apparatus of claim 9, wherein the network management logic is configured to request the GRE logic to establish the particular GRE tunnel to a provider edge router of an MPLS network of a network service provider.

13. The apparatus of claim 9, wherein the network management logic is configured to request the GRE logic to establish a plurality of GRE tunnels to a provider edge router of an MPLS network of a network service provider, wherein each tunnel in the plurality of GRE tunnels is associated with a different customer or VPN of the network service provider.

14. The apparatus of claim 9, wherein the network management logic is configured to request the GRE logic to establish the particular GRE tunnel to a router that is two or more physical hops, in the network, away from the apparatus.

15. The apparatus of claim 9, wherein the requesting means further comprises means for requesting the routing protocol logic to provide one or more values from the synchronized route database, using an SNMP request.

16. The apparatus of claim 9, wherein the requesting means further comprises means for requesting the routing protocol logic to provide one or more values from the synchronized route database, using a TELNET connection.

17. A machine-implemented method, performed by a computing device, the method comprising:
   establishing one or more generic routing encapsulation (GRE) tunnels through a network from a network management system to a router in the network;
   operating a routing protocol on the network management system;
   exchanging network route update information through the one or more GRE tunnels with the router in the network, using the routing protocol;
   creating and storing a first route database in the network management system, wherein the first route database is synchronized to a second route database of the router, based on the exchanging,
   wherein the first route database comprises routing information specifying where to route received packets;
   determining whether the first route database is missing one or more particular routes;
   generating a notification message in the network when the first route database is missing the one or more particular routes.

18. The method of claim 17, comprising operating Border Gateway Protocol version 4 (BGPv4) as the routing protocol.

19. The method of claim 17, comprising operating any of Open Shortest Path First (OSPF) protocol, Intermediate System-Intermediate System (IS-IS) protocol, RIP, and RIPv2 as the routing protocol.

20. The method of claim 17, comprising requesting the GRE logic to establish the particular GRE tunnel to a provider edge router of an MPLS network of a network service provider.

21. The method of claim 17, comprising requesting the GRE logic to establish a plurality of GRE tunnels to a provider edge router of an MPLS network of a network service provider, wherein each tunnel in the plurality of GRE tunnels is associated with a different customer or VPN of the network service provider.

22. The method of claim 17, comprising requesting the GRE logic to establish the particular GRE tunnel to a router that is two or more physical hops, in the network, away from the computing device.

23. The method of claim 17, comprising requesting the routing protocol logic to provide one or more values from the synchronized route database, using an SNMP request.

24. The method of claim 17, comprising requesting the routing protocol logic to provide one or more values from the synchronized route database, using a TELNET connection.

25. A computer-readable tangible storage medium carrying one or more sequences of instructions, which instructions, when executed by one or more processors, cause the one or more processors to carry out the steps of:
   establishing one or more generic routing encapsulation (GRE) tunnels through a network from a network management system to a router in the network;
   operating a routing protocol on the network management system;
   exchanging network route update information through the one or more GRE tunnels with the router in the network, using the routing protocol;
   creating and storing a first route database in the network management system, wherein the first route database is synchronized to second route database of the router, based on the exchanging,
   wherein the first route database comprises routing information specifying where to route received packets;
   determining whether the first route database is missing one or more particular routes;
   generating a notification message in the network when the first route database is missing the one or more particular routes.

* * * * *

UNITED STATES PATENT AND TRADEMARK OFFICE
CERTIFICATE OF CORRECTION

PATENT NO. : 7,646,731 B2 Page 1 of 1
APPLICATION NO. : 11/642175
DATED : January 12, 2010
INVENTOR(S) : Andrew Ballantyne et al.

It is certified that error appears in the above-identified patent and that said Letters Patent is hereby corrected as shown below:

In the Claims:

COLUMN 12

Claim 9: Line 61, after "routes" insert --;--

Signed and Sealed this

Eighth Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,646,731 B2
APPLICATION NO. : 11/642175
DATED : January 12, 2010
INVENTOR(S) : Ballantyne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 406 days.

Signed and Sealed this

Twenty-eighth Day of December, 2010

David J. Kappos
*Director of the United States Patent and Trademark Office*